US009154918B2

(12) United States Patent
Enoki et al.

(10) Patent No.: US 9,154,918 B2
(45) Date of Patent: Oct. 6, 2015

(54) ESTIMATING LOCATION BASED ON SOCIAL MEDIA

(71) Applicant: International Business Machines Corporation, Armonk, NY (US)

(72) Inventors: Miki Enoki, Tokyo (JP); Yohei Ikawa, Tokyo (JP); Michiaki Tatsubori, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 124 days.

(21) Appl. No.: 13/775,381

(22) Filed: Feb. 25, 2013

(65) Prior Publication Data

US 2013/0225198 A1  Aug. 29, 2013

(30) Foreign Application Priority Data

Feb. 27, 2012 (JP) ................................ 2012-040265

(51) Int. Cl.

| H04W 4/04 | (2009.01) |
|---|---|
| H04W 4/02 | (2009.01) |
| H04W 4/08 | (2009.01) |
| H04W 4/20 | (2009.01) |

(52) U.S. Cl.
CPC .................. *H04W 4/04* (2013.01); *H04W 4/02* (2013.01); *H04W 4/08* (2013.01); *H04W 4/206* (2013.01)

(58) Field of Classification Search
CPC ...................... H04W 4/02–4/08; H04W 4/206; H04W 4/22
See application file for complete search history.

(56) References Cited

U.S. PATENT DOCUMENTS

| 2005/0197775 A1* | 9/2005 | Smith ................................. 702/3 |
|---|---|---|
| 2009/0047972 A1* | 2/2009 | Neeraj ......................... 455/456.1 |
| 2010/0082247 A1* | 4/2010 | Klein et al. .................... 701/209 |
| 2010/0185932 A1* | 7/2010 | Coffman et al. .............. 715/230 |
| 2012/0005221 A1* | 1/2012 | Ickman et al. ................. 707/769 |

FOREIGN PATENT DOCUMENTS

| JP | 2008158564 A | 7/2008 |
|---|---|---|
| JP | 2010517147 A | 5/2010 |
| JP | 4752293 B2 | 8/2011 |

OTHER PUBLICATIONS

T. Sakamaki, et al., "Estimation of Human Behavior of a User Using Geotagging of Microblogging," IEICE Technical Report, NLC2010-37, 2011,With English Abstract; pp. 1-3.

* cited by examiner

*Primary Examiner* — San Htun
(74) *Attorney, Agent, or Firm* — Cantor Colburn LLP

(57) ABSTRACT

A method for processing a first and second message groups submitted by a user includes executing a learning operation and an estimating operation. The learning operation includes extracting a first location message having a specifiable location from the first message group, extracting a first expression message including a specific expression from the first message group; and associating the location and the expression on the basis of the date and time submitted with each message, and for generating learning data. The estimating operation includes extracting a second expression message including a predetermined expression from the second message group, accepting input of a specified date and time for estimating a location; associating the expressions with each other on the basis of the specified date and time; and estimating a location at the specified date and time using coordination filtering on the basis of the learning data and the input data.

17 Claims, 10 Drawing Sheets

(a)

(b)

(a)

(b)

ESTIMATING LOCATION BASED ON SOCIAL MEDIA

PRIORITY

This application claims priority to Japanese Patent Application No. 2012-040265, filed Feb. 27, 2012 and all the benefits accruing therefrom under 35 U.S.C. §119, the contents of which in its entirety are herein incorporated by reference.

BACKGROUND

The present invention relates to an information processing technology, and more specifically to a technology for estimating a location posted to social media such as microblogging.

As the use of social media becomes more widespread, there is a desire to know the location at which information was posted to social media by various users. For example, when disaster information is posted by a user, the location of the user can be quickly determined and the necessary countermeasures can be taken. When information is posted to social media via a mobile device such as a smart phone, it is assumed that the location of that device is constantly changing. The global positioning system (GPS) function in mobile devices has been used to address this problem, and there have been attempts to add longitude and latitude information (so-called geotags) to information posted by users (see, e.g., laid-open Patent Publication No. 2010-517147). A technology has also been proposed in which the text in posted information is analyzed and the location is estimated from geographic names included in the text (see, e.g., laid-open Patent Publication No. 2010-517147 and laid-open Patent Publication No. 2008-158564).

SUMMARY

In one embodiment, a method for processing a first message group and a second message group submitted by a user on the basis of the date and time submitted with each message, includes executing, with a computer, a learning operation and an estimating operation. The learning operation further includes extracting a first location message from the first message group, the first location message being a message having a specifiable location; extracting a first expression message from the first message group, the first expression message being a message including a specific expression; and associating the location and the expression on the basis of the date and time submitted with each message, and for generating learning data. The estimating operation further includes extracting a second expression message from the second message group, the second expression message including a predetermined expression; accepting input of a specified date and time, the specified date and time being the date and time for estimating a location; associating the expressions with each other on the basis of the specified date and time and the date and time submitted with each second expression message, and for generating input data; and estimating a location at the specified date and time using coordination filtering on the basis of the learning data and the input data.

In another embodiment, a system includes a computer configured to process a first message group and a second message group submitted by a user on the basis of the date and time submitted with each message, the computer comprising a learning module and an estimating module. The learning module is further configured to extract a first location message from the first message group, the first location message being a message having a specifiable location; extract a first expression message from the first message group, the first expression message being a message including a specific expression; and associate the location and the expression on the basis of the date and time submitted with each message, and for generating learning data. The estimating module is further configured to extract a second expression message from the second message group, the second expression message including a predetermined expression; accept input of a specified date and time, the specified date and time being the date and time for estimating a location; associate the expressions with each other on the basis of the specified date and time and the date and time submitted with each second expression message, and for generating input data; and estimate a location at the specified date and time using coordination filtering on the basis of the learning data and the input data.

In another embodiment, a computer readable storage medium has computer readable instructions stored thereon that, when executed by a computer, implements a method for processing a first message group and a second message group submitted by a user on the basis of the date and time submitted with each message. The method includes executing, with the computer, a learning operation and an estimating operation. The learning operation further includes extracting a first location message from the first message group, the first location message being a message having a specifiable location; extracting a first expression message from the first message group, the first expression message being a message including a specific expression; and associating the location and the expression on the basis of the date and time submitted with each message, and for generating learning data. The estimating operation further includes extracting a second expression message from the second message group, the second expression message including a predetermined expression; accepting input of a specified date and time, the specified date and time being the date and time for estimating a location; associating the expressions with each other on the basis of the specified date and time and the date and time submitted with each second expression message, and for generating input data; and estimating a location at the specified date and time using coordination filtering on the basis of the learning data and the input data.

DETAILED DESCRIPTION

Figure 1:
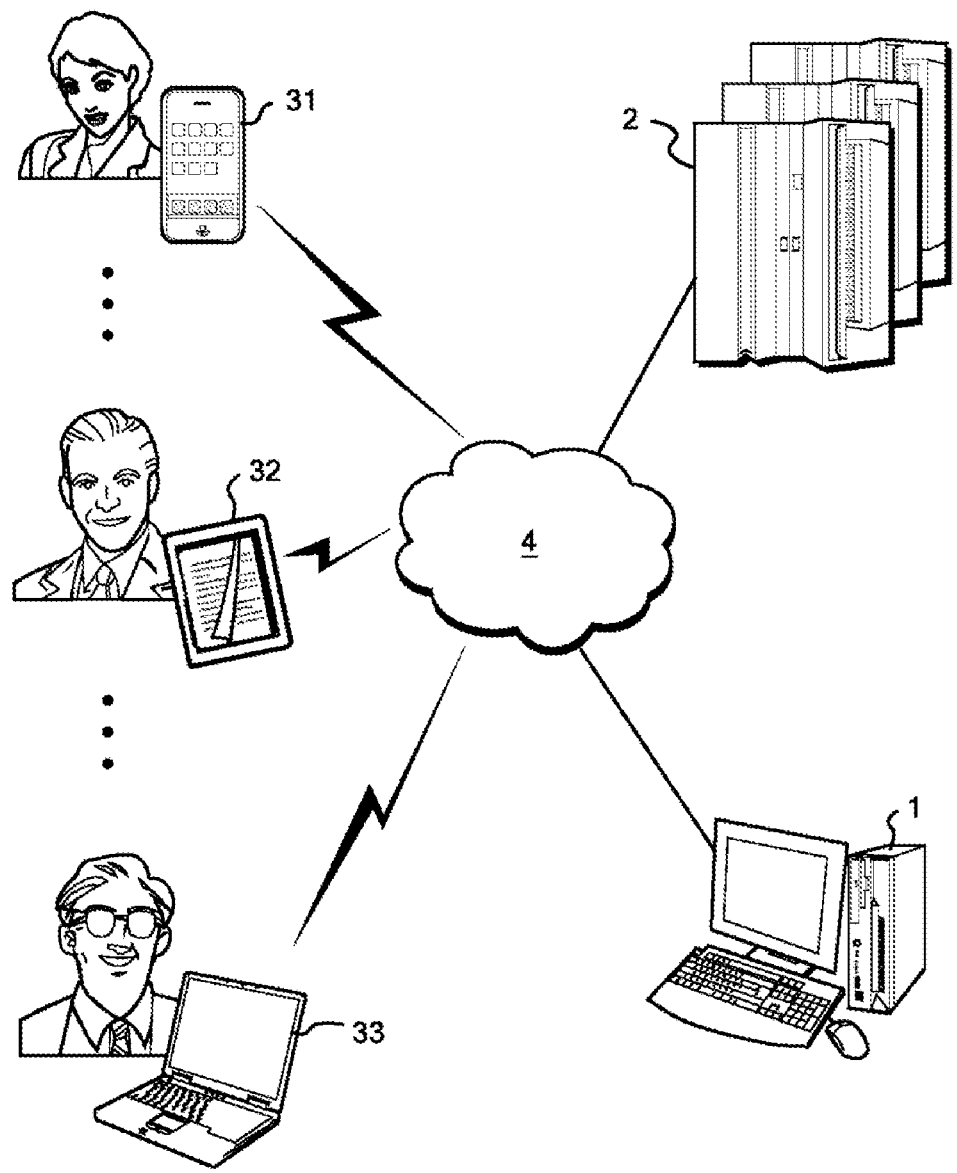
FIG. 1 is a conceptual diagram used to explain the microblogging system.

As indicated above, one generally cannot expect too much from information including geotags and from the geographic names in the text of posted information. In view of this, the present invention embodiments provide a technology for estimating a location posted to social media such as microblogging.

A method is disclosed for processing a first message group and a second message group submitted by a user on the basis of the date and time submitted with each message, in which the method has a learning operation and an estimating operation, in which the learning operation includes a sub-operation for extracting a first location message from the first message group, the first location message being a message having a specifiable location, a sub-operation for extracting a first expression message from the first message group, the first expression message being a message including a specific expression, and a sub-operation for associating the location and the expression on the basis of the date and time submitted with each message, and for generating learning data, and in which the estimating operation includes a sub-operation for extracting a second expression message from the second message group, the second expression message including a predetermined expression, a sub-operation for accepting input of a specified date and time, the specified date and time being the date and time for estimating a location, a sub-operation for associating the expressions with each other on the basis of the specified date and time and the date and time submitted with each second expression message, and for generating input data, and a sub-operation for estimating a location at the specified date and time using coordination filtering on the basis of the learning data and the input data.

Here, the sub-operation for extracting the first location message can extract the first message as a first location message on condition that the first location message includes a place name found in a pre-installed place name dictionary. Also, the sub-operation for generating learning data can make an association stronger when closer to the date and time submitted with each message, and can make associations that take into account the periodicity of the date and time submitted with each message. In addition, it can make associations that take into account the periodicity of the date and time submitted with each message on condition that the user profile is a predetermined profile. The periodicity can be a daily period, weekly period or monthly period.

Also, the learning operation includes place of work in the user profile, and further includes a sub-operation for associating the location and the expression and for generating learning data on condition that the first expression message indicates "at work". In addition, the learning operation includes place of residence in the user profile, and further includes a sub-operation for associating the location and the expression and for generating learning data on condition that the first expression message indicates "at home". These sub-operations make associations between the location and the expression on the basis of the date and time submitted in each message, and can make the associations stronger than the associations in the sub-operations for generating learning data.

Also, the sub-operation for accepting input of a specified date and time can accept the date and time submitted with a specific second expression method by accepting selection of the specific second expression message, and further include an output operation. This output operation (C) can include a sub-operation (c1) for displaying a location at the specified date and time in association with the specific second expression message. The second message group can be displayed on a time line, the second expression messages can be displayed in a mode allowing for selection, and the sub-operation (c1) can display a location at a specified date and time near the specific second expression message in response to selection of the specific second expression message.

The messages can be messages sampled under predetermined conditions from messages submitted to social media. These messages can also be messages sampled under predetermined conditions including passwords from messages submitted to social media within a predetermined period of time. These social media can include microblogging.

Even when implemented as a computer program or a computer system, the technical features are substantially the same as those when the present invention embodiments are understood as a method. The present invention embodiments may estimate a location posted to social media such as microblogging.

Specific embodiments are explained in further detail below with reference to the drawings. However, the scope of the claims is not limited to the following exemplary embodiment, and all combinations of features explained in the embodiment are not necessarily essential to a technical solution of the disclosure. Also, the present invention embodiments can be implemented in different ways, and should not be construed as limited to the content of the embodiment described below. Also, all combinations of the features explained in the embodiment are not necessarily essential to the technical solution of the invention. The same elements are denoted by the same numbers throughout the entire explanation of the embodiment (unless otherwise noted).

FIG. 1 is a conceptual diagram used to explain the microblogging system, which is an example of social media. This system includes microblogging servers 2 and user terminals (1, 31, 32, 33), and these are connected via the Internet 4 so as to be able to communicate with each other. The user terminals can be any computer with a communication function. In addition to the personal computer 1, smart phone 31, tablet 32, and (notebook-type) personal computer 33 shown in the drawing, examples of mobile devices include personal digital assistants (PDAs, portable information terminals), onboard computers, and netbooks not shown in the drawing.

Figure 2:
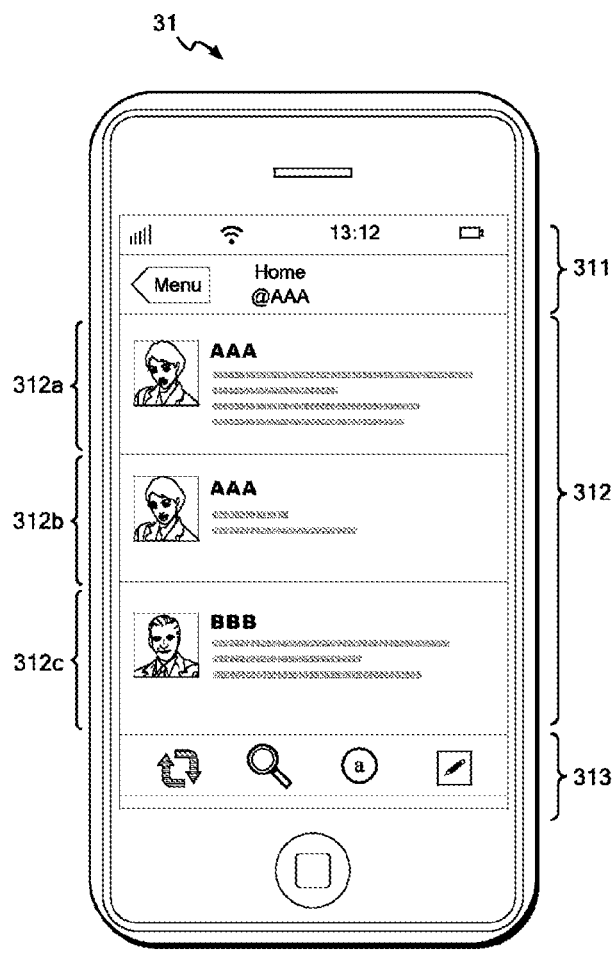
FIG. 2 is a diagram used to explain a smart phone serving as a user terminal and a screen displayed on the smart phone.

FIG. 2 is a diagram used to explain a smart phone 31 serving as a user terminal and a screen displayed on the smart phone. A microblogging application screen is displayed on the touch screen of the smart phone 31, and the application screen is divided from top to bottom into a home section 311, a time line section 312, and an operation section 313. The home section includes a menu button, and the time line section 312 displays the time line of user AAA. The time line section 312 displays from top to bottom message sections 312a, 312b for user AAA, and a message section 312c for user BBB (a follower). These message sections 312a-c are displayed in a time series. In other words, the message section 312a at the top of the screen corresponds to the most recent message.

Figure 3:
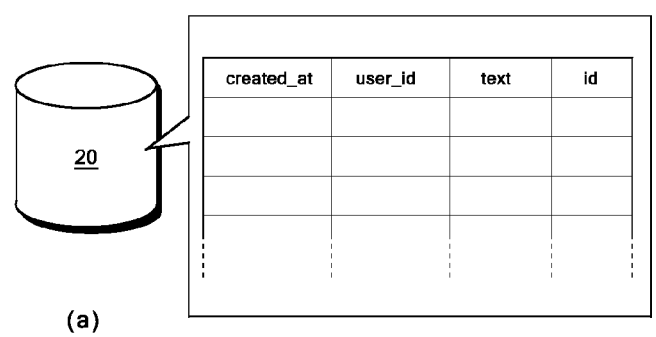
FIG. 3 is a diagram used to explain the structure of data stored in the hard disk device of a microblogging server.
Figure 3:
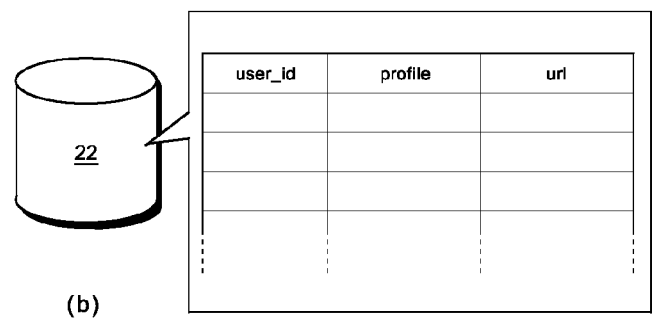

FIG. 3 is a diagram used to explain the structure of data stored in the hard disk devices 20, 22 of a microblogging server 2. The message table stored in hard disk device 20 (FIG. 3(a)) includes the date and time each message was posted (created_at), the message ID (id) identifying each message, the user ID (user_id) identifying the user who posted the message, and the text (text) of the message. A character limit can also be provided for text (for example, 140 characters or less). The profile table stored in hard disk device 22 (FIG. 3(b)) includes the user ID (user_id) identifying each user, the name of each user (not shown), profile information indicating the profiles of users (profile), and URL information for the address of a related web page (url).

Figure 4:
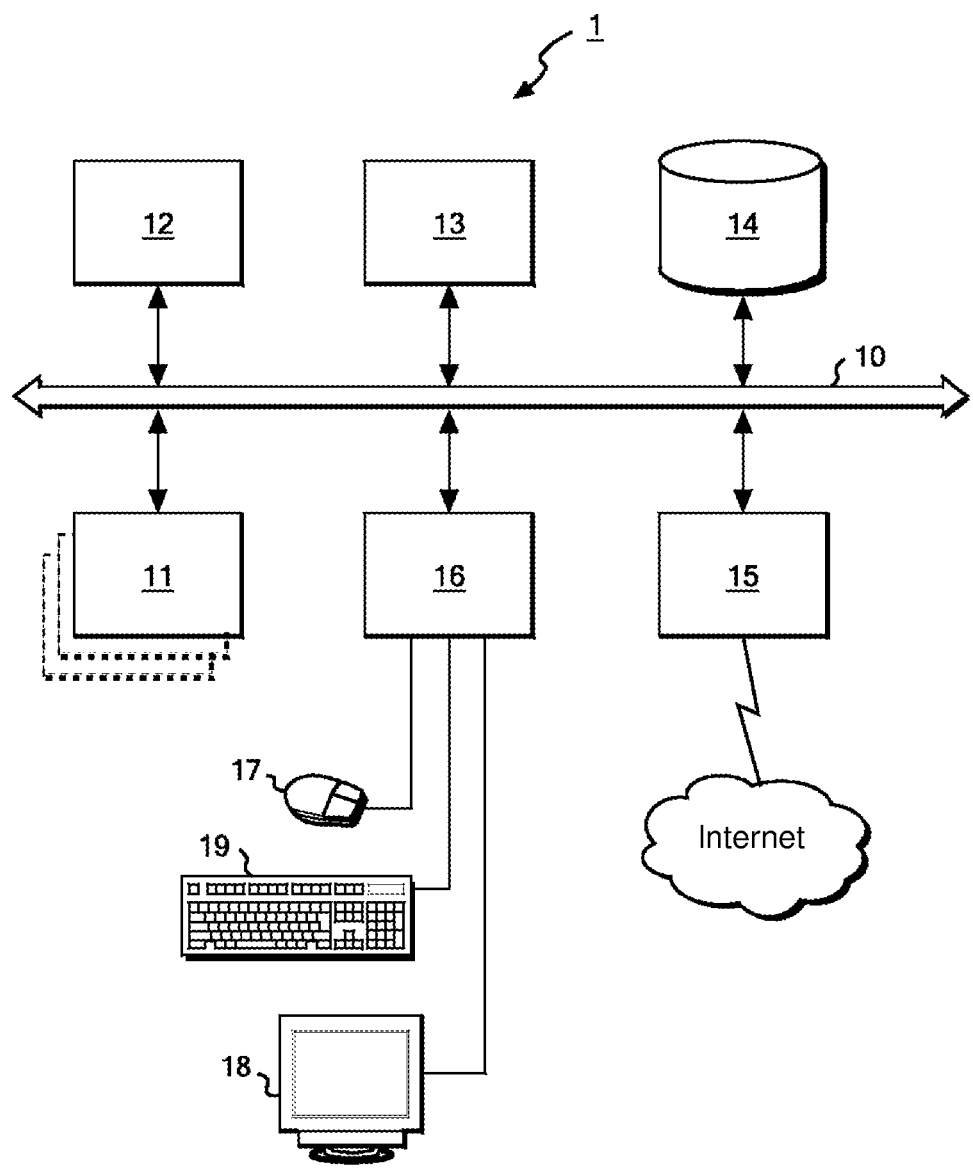
FIG. 4 is a block diagram used to explain the hardware configuration of the computer.

FIG. 4 is a block diagram used to explain the hardware configuration of the personal computer 1. The hardware configuration of the computer 1 includes a (low-speed and high-speed) bus 10. Connected to the bus 10 are a CPU (arithmetic and control device) 11, random access memory (RAM: storage device) 12, read-only memory (ROM: storage device) 13, a hard disk drive (HDD: storage device) 14, a communication interface 15, and an input/output interface 16. Connected to the input/output interface 16 are a mouse 17, flat panel display (display device) 18, and a keyboard 19. The computer 1 explained here has conventional personal computer architecture, but more than one CPU 11 or HDD 14 can be when available to boost data processing performance. In addition to a desktop model, other types of computer systems can be used.

The software configuration of the computer 1 includes an operating system (OS) providing basic functions, application software using OS functions, and driver software for the input/output devices. This software is loaded into the RAM 12 along with various types of data and executed by the CPU 11 to allow the computer 1 to function as the function modules shown in FIG. 5 and to execute the processing shown in FIG. 6.

Figure 5:
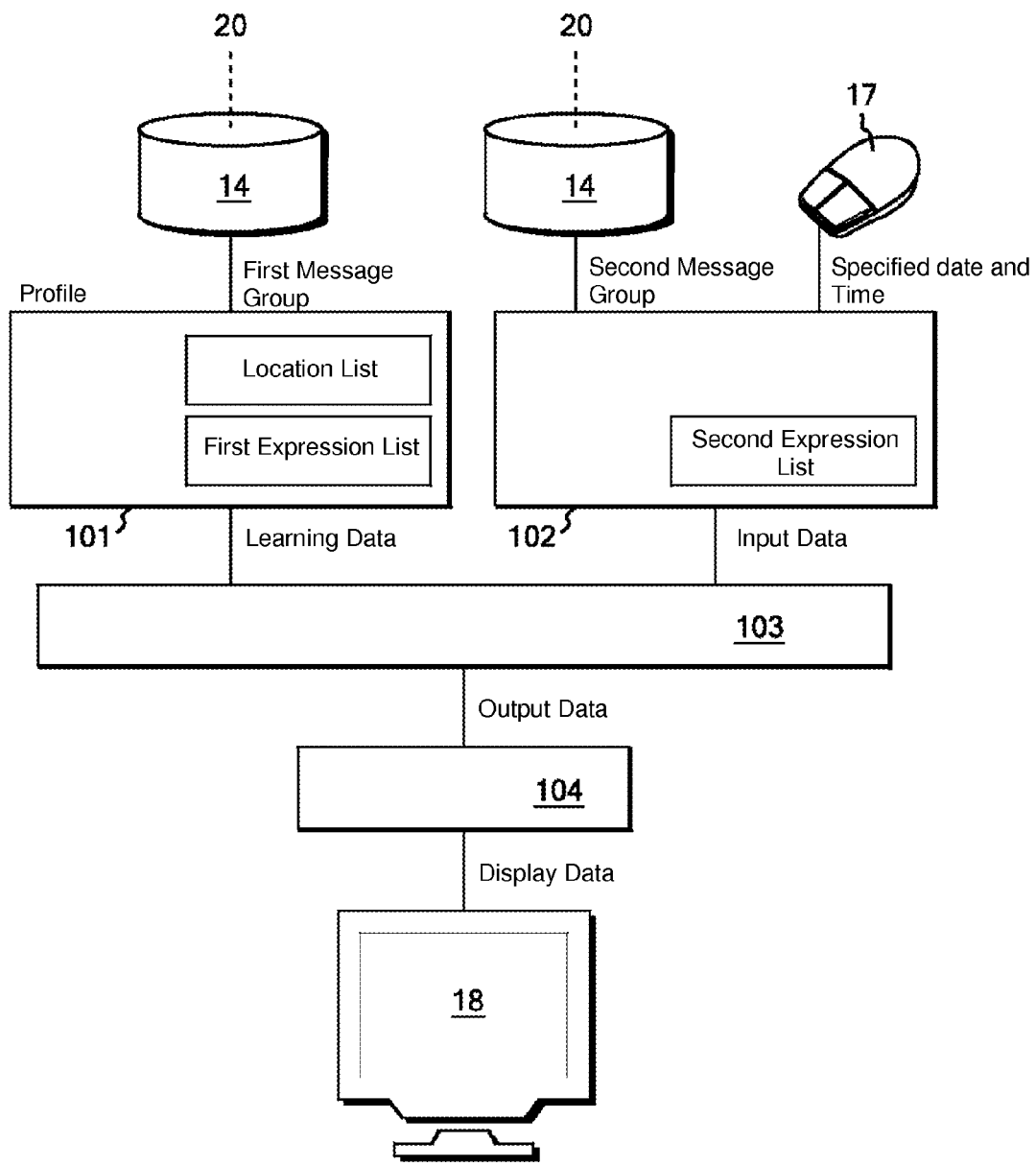
FIG. 5 is a block diagram used to explain the functions of the computer.

FIG. 5 is a block diagram used to explain the function modules of the computer 1 in this embodiment. The computer 1 functions as a learning module 101, an input module 102, an estimating module 103 and a display module 104. Here, the learning module 101 includes a location list (geographic name dictionary) and a first expression list. The input module 102 includes a second expression list. The structures of the first expression list and the second expression list can be the same or different. The content of the location list, the first expression list and the second expression list will be described below with reference to FIG. 7 and FIG. 8.

Profile data and data for the first message group are inputted to the learning module 101. This data is stored in the HDD 14. The original data is stored in the microblogging server 2 (see FIG. 3(a) and FIG. 3(b)). This is downloaded to the computer 1 via the Internet 4 based on certain conditions (for example, a group of messages posted within a predetermined period of time by specific users or users with a specific profile linked by user ID, and optionally groups of messages including words in the location list or first expression list). Learning data is also outputted from the learning module 101.

Data for the second message group and data for a specified date and time are inputted to the input module 101. Data for the second message group is stored in HDD 14. The original data is stored in the microblogging server 2 (see FIG. 3(a)). This is downloaded to the computer 1 via the Internet 4 based on certain conditions (for example, a group of messages posted within a predetermined period of time by specific users or users with a specific profile linked by user ID, and optionally groups of messages including words in the location list or first expression list). The data for a specified date and time can be inputted by the operator using the keyboard 19 for the computer 1. The date and time at which a second message was posted can be inputted as the specified date and time by using the mouse 17 to click the second message in the second message group displayed on the display 18. Input data is also outputted from the input module 102.

Learning data from the learning module 101 and input data from the input module 102 is inputted to the estimating module 103. Output data is outputted from the estimating module 103. Output data from the estimating module 103 is inputted to the display module 104. Display data is outputted from the display module 104.

Figure 6:
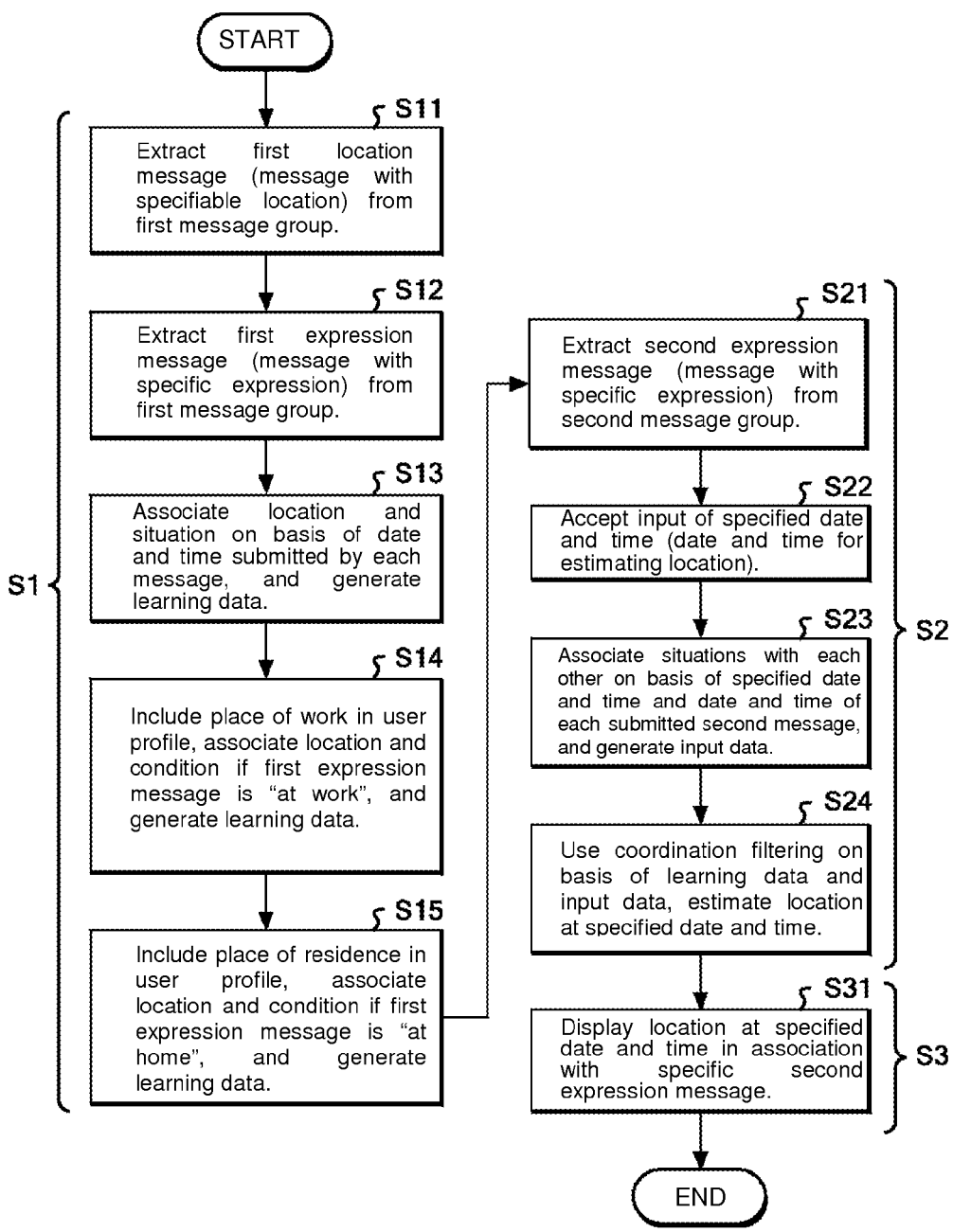
FIG. 6 is a flowchart used to explain the processing executed by the computer.

FIG. 6 is a flowchart used to explain the processing executed by the computer 1 in this embodiment, and is broadly divided into the learning operation (S1), an estimating operation (S2), and an output operation (S3).

Figure 7:
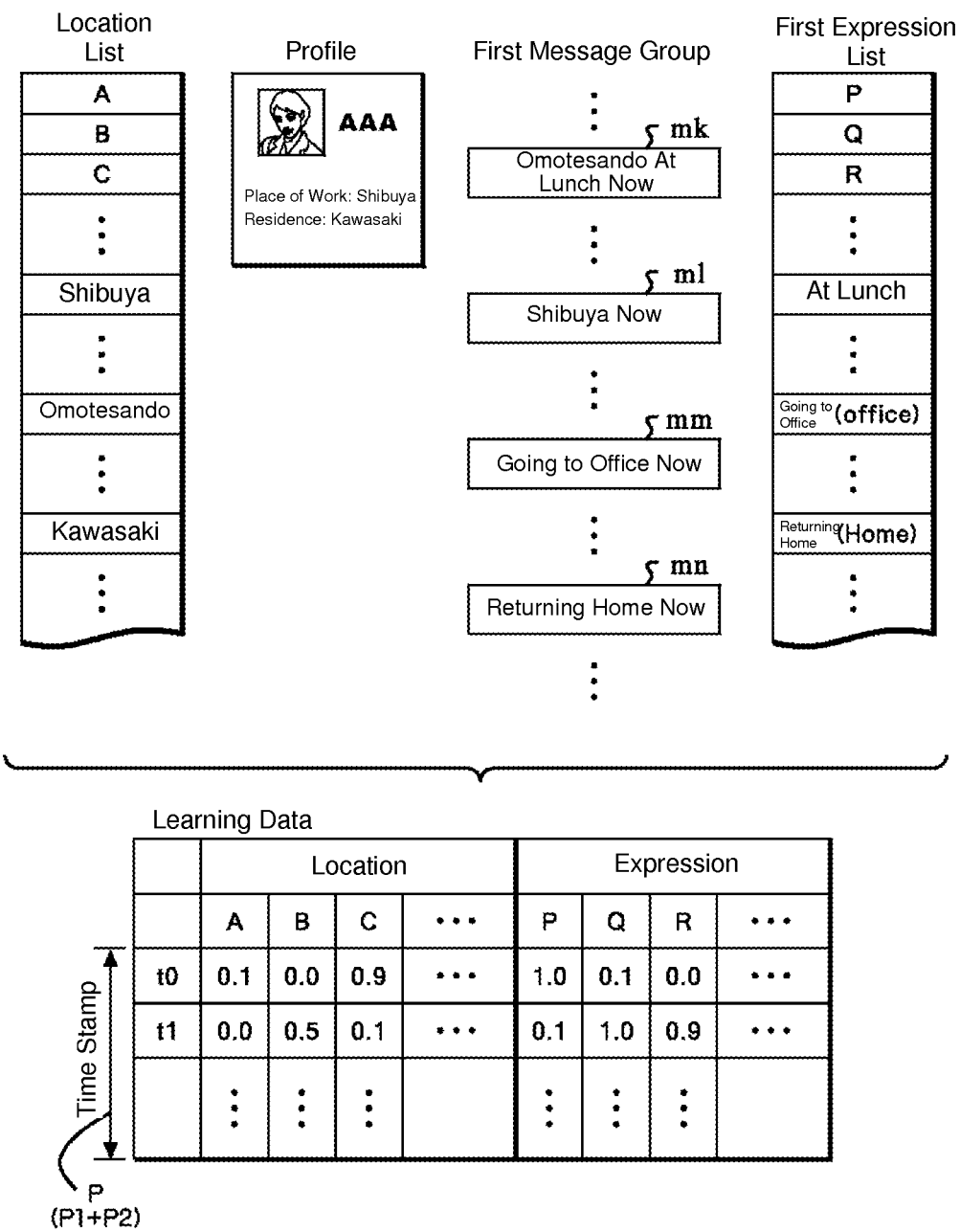
FIG. 7 is a conceptual diagram used to explain the learning operation.

FIG. 7 is a conceptual diagram used to explain the learning operation (S1) performed by the learning module 101. First, the learning module 101 extracts a first location message, which is a message having a specifiable location, from the first message group (S11). In other words, the learning module 101 references the location list, and extracts a message including in the text any geographic name (A, B, C, ...) included in the list. Here, the geographic names in the location list include "Shibuya" and "Omotesando". Message ml and message mk, which include these in the text, are extracted as first location messages. Next, the learning module 101 extracts a first expression message, which is a message including a predetermined expression, from the first message group (S12). In other words, the learning module 101 references the first expression list, and extracts a message including in the text any expression (P, Q, R, ...) included in the list. Here, the expressions include "at lunch", "going to office", and "returning home". Message mk, message mm, and message mn, which include these in the text, are extracted as first expression messages.

Next, the learning module 101 associates a location and an expression on the basis of the date and time submitted with each message, and generates learning data (S13). First, a location specified in a first location message is linked to the date and time of the posting. Here, the date and time at which message ml was posted is tl, and date and time tl and the location "Shibuya" are linked. Similarly, date and time tk and location "Omotesando" are linked. Next, expressions specified in first expression messages and the dates and times of their posting are linked. Here, the date and time at which message mk was posted is tk, and date and time tk and the expression "at lunch" are linked. Similarly, date and time tm and the expression "going to office" are linked, and date and time tn and the expression "returning home" are linked. In other words, the location or expression at a given date and time are represented at row n, column 1, and the element for the location or the expression in the link is set to "1". The other elements are set to "0". For example, the row for date and time tl has "1" only at the location "Shibuya". All other locations and expressions have "0".

Next, the learning module 101 links locations and expressions (adjacent lines) on the basis of proximity to a date and time. Here, the date and time tl for the posting of message ml and the date and time tm for the posting of message mm are very close (for example, within ten minutes), so the relatively high value of "0.9" is set in the column for the expression "going to office" in the learning data corresponding to date and time tl, and the relatively high value of "0.9" is set in the column for the location "Shibuya" corresponding to date and time tm. When date and time tl and date and time tm are within some intermediate range (for example, greater than ten minutes but less than one hour), an intermediate value of "0.5" is set in the column for the expression "going to office" in the learning data corresponding to date and time tl, and an intermediate value of "0.5" is set in the column for the location "Shibuya" corresponding to date and time tm. When date and time tl and date and time tm are far apart (for example, greater than one hour), a low value of "0.1" is set in the column for the expression "going to office" in the learning data corresponding to date and time tl, and a low value of "0.1" is set in the column for the location "Shibuya" corresponding to date and time tm. This operation is significant and reflects the possibility that, when a user is at a given location, he or she probably has been/will remain at that location for a while, and that, when a user is in a certain situation, he or she probably has been/will be in that situation for a while. The time threshold value for linking a location and an expression can be changed depending on the expression. For example, a relatively short time threshold value can be set for "at lunch" on the assumption that the user will move to that location for about an hour, and a relatively long time threshold value can be set for "return home" on the assumption that the user will remain at that location for several hours.

So far in this explanation, user data has been generated using only the first message group. However, learning data can also be generated using a user profile. In other words, "place of work" can be included in a user profile, and this location can be associated with an expression, and learning data generated, on condition that a first expression message indicates that the user is "at work" (S14). Here, the place of work included in the profile of user AAA is "Shibuya". Because first expression message mm includes "going to office" which indicates the user is "at work", the location "Shibuya" and the expression "going to office" are linked. Also, to make the link very strong, a very large value of "1" is set in the column for the expression "going to office" and the column for the location "Shibuya" as learning data corresponding to date and time tm. This reflects the near certainty that "going to office" means going to "Shibuya", because the user's place of work is "Shibuya". Among the expressions in the first expression list, the attribute (office) is applied to expressions indicating "at work". By referencing this attribute, an expression indicating "at work" can be specified. In addition to "going to office", expressions indicating "at work" include "meeting", etc.

Also, "place of residence" can be included in a user profile, and the learning module 101 can associate this location with an expression, and generate learning data, on condition that a first expression message indicates that the user is "at home" (S15). Here, the place of residence included in the profile of user AAA is "Kawasaki". Because first expression message mn includes "returning home" which indicates the user is "at home", the location "Kawasaki" and the expression "returning home" are linked. Also, to make the link very strong, a very large value of "1" is set in the column for the expression "returning home" and the column for the location "Kawasaki" as learning data corresponding to date and time tn. This reflects the near certainty that "returning home" means going to "Kawasaki", because the user's place of residence is "Kawasaki". Among the expressions in the first expression list, the attribute (home) is applied to expressions indicating "at home". By referencing this attribute, an expression indicating "at home" can be specified. In addition to "returning home", expressions indicating "at home" include "going to bed", etc. Even when learning data is generated using a user profile, the learning module 101 can link locations and expressions (adjacent lines) according to proximity to a date and time.

Here, the time stamps for learning data can be separated into fixed periods (period P). For example, the time stamps can be separated by day (by 24-hour periods). By using messages from a plurality of days as the first message group, learning data can be generated in a superimposed way. The assumption is that the living pattern of the user has a certain periodicity. The time stamps can be separated by weekday 24-hour periods (P1) and weekend 24-hour periods (P2) on condition that the user profile includes "place of work". The assumption is that there is a significant difference in the living pattern of the user on weekdays and on weekends if the user is a company employee.

Figure 8:
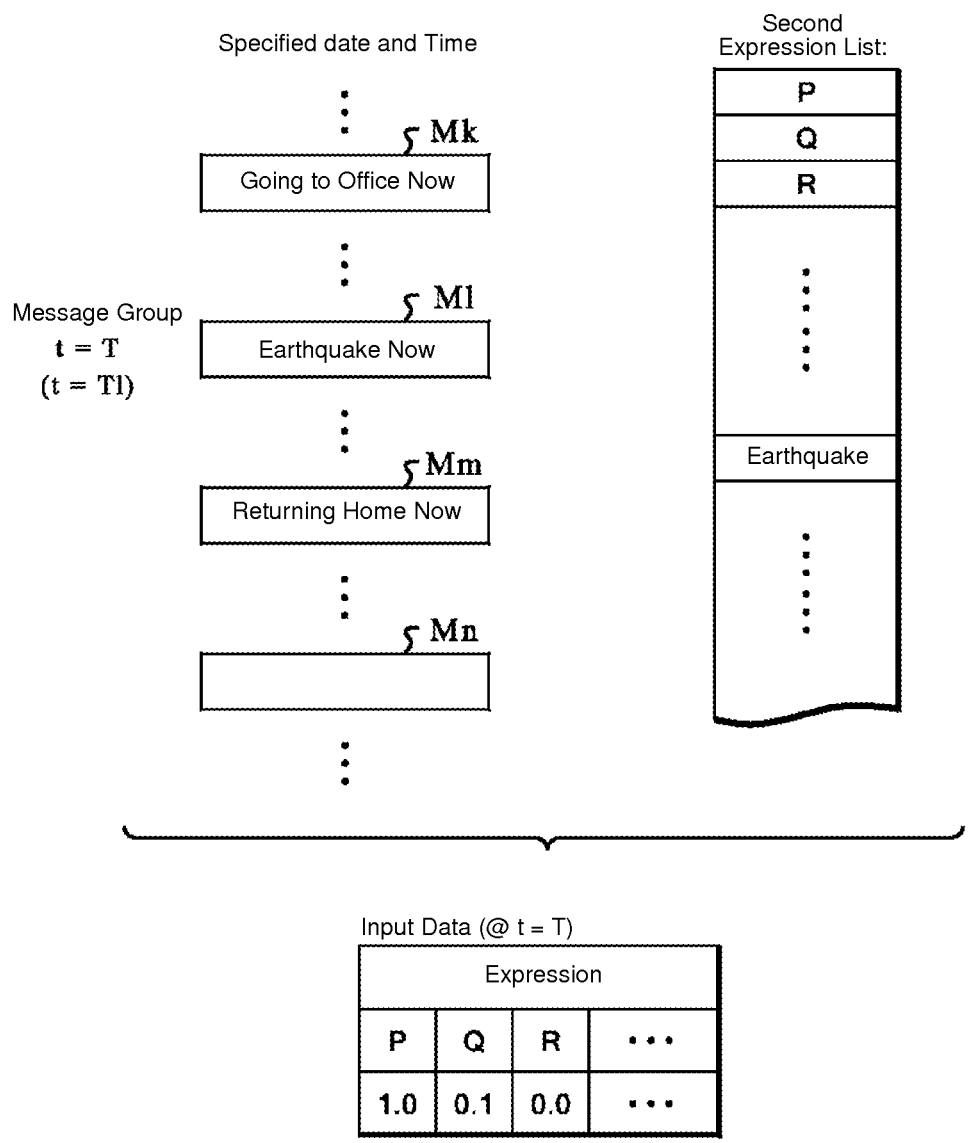
FIG. 8 is a conceptual diagram used to explain the estimating operation.
Figure 9:
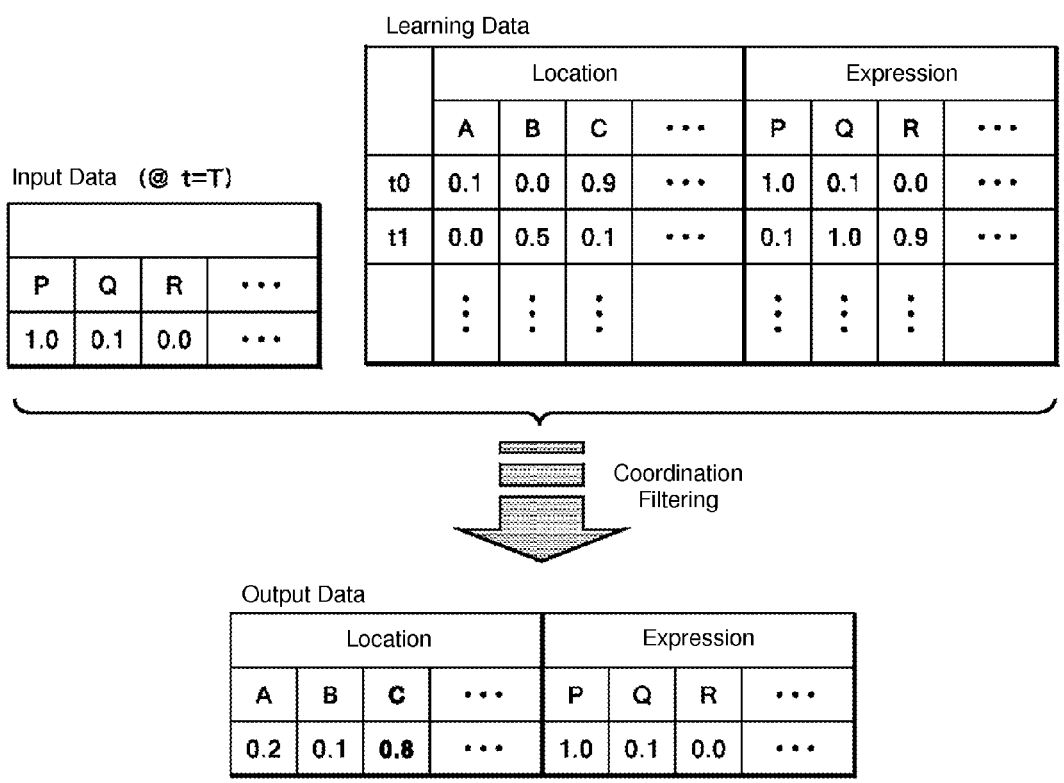
FIG. 9 is another conceptual diagram used to explain the estimating operation.

FIG. 8 and FIG. 9 are conceptual diagrams used to explain the estimating operation (S2) performed by the input module 102 and the estimating module 103. First, the input module 102 extracts a second expression message, which is a message including a predetermined expression, from the second message group (a set of messages different from the first message group) (S21). In other words, the input module 102 references the second expression list, and extracts messages including in the text expressions (P, Q, R, . . . ) included in the list. Here, "earthquake" is included as an expression in the second expression list, and message Ml including this expression in the text is extracted. The second message group is displayed on the display 18 of the computer 1 in chronological order (by time stamp).

Next, the input module 102 accepts input of a specified date and time T, which is the date and time at which a place estimation is to be performed (S22). Here, the operator uses the mouse 17 to input the date and time Tl at which the message was posted as the specified date and time T by clicking message Ml in the second message group displayed on the display 18. Then the estimating module 102 links other second expression messages according to proximity to the specified date and time T, and generates input data (S23). Here, the date and time for the posting of message Ml is t=Tl, and the date and time Tk of the posting of message Mk are very close (for example, within ten minutes), so the relatively high value of "0.9" is set in the column for the expression "going to office" in the input data. Meanwhile, the date and time for the posting of message Ml is t=Tl, and the date and time Tm of the posting of message Mm are far apart (for example, more than one hour), so the relatively low value of "0.1" is set in the column for the expression "returning home" in the input data.

Next, the estimating module 103 uses coordination filtering to obtain the output data shown in FIG. 9 on the basis of the learning data shown in FIG. 7 and the input data shown in FIG. 8. Here, the co-occurrence score is defined as follows: <co-occurrence score>=1/(1+<temporal distance>), <expression P's score>=1/(1+|<now>−time stamp (M)|), where P is in message M. In this way, values were obtained for output data. In the output data, a degree of certainty (confidence) is assigned for each geographic name (A, B, C, . . . ) included in the location list. In the example shown in FIG. 9, the degree of certainty for geographic name C is "0.8", which is higher than the others. This means it has been estimated that there is a good possibility that user AAA will be at location "C" (for example, Shibuya) at specified date and time T.

Figure 10:
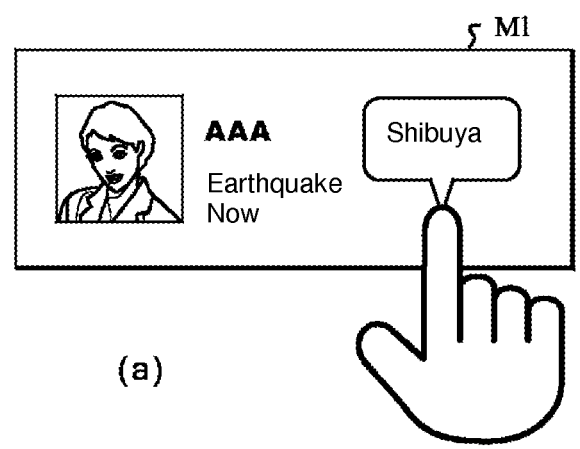
FIG. 10 is a diagram used to explain the display mode.
Figure 10:
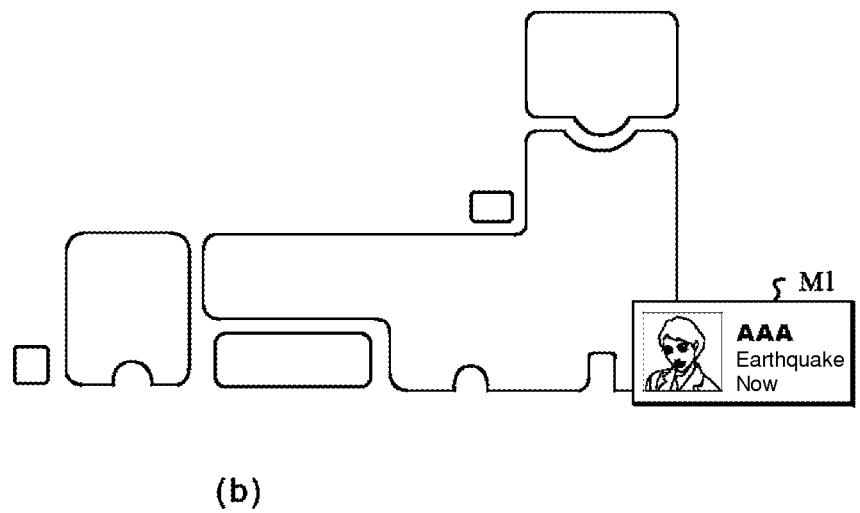

FIG. 10 is a diagram used to explain the display mode for the results of the output operation (S3) performed by the output module 104. The output module 104 receives the output data shown in FIG. 9, and displays the location at specified time T associated with message Ml by sending display data to the display 18 (S31). The display mode is as follows. The second message group is displayed in chronological order on the display 18. Among these messages, second expression message Ml is displayed so that it can be selected (for example, it is displayed in a different color from the other messages). In response to the selection of second expression message Ml (for example, moving the cursor over the second expression message Ml using the mouse 17), the location at the specified date and time T (for example, "Shibuya") is displayed next to the second expression message Ml (see FIG. 10($a$)). The location can be displayed along with a degree of certainty (for example, "0.8" as in "Shibuya (0.8)". A plurality of locations can also be displayed along with a degree of certainty (for example, Shibuya (0.8), Omotesando (0.7), Osaka (0.0)). Alternatively, second expression message Ml can be displayed on a map on the basis of the location at specified date and time T (see FIG. 10(b)).

The present invention can be embodied using hardware only, software only, or a combination of both hardware and software elements. The present invention is not limited to the preferred embodiment described above. It can be implemented in software, including firmware, resident software, microcode, and parsed pico-code.

The present invention can also take the form of a computer program in programming code used by or associated with a computer or any other instruction executing system, as well as computer readable media. For the purposes of the present explanation, the computer-readable media can be any device able to contain, store, communicate, transmit or propagate a program used by or associated with any instruction executing system or device. More specifically, the parsing control module described above means an instruction executing system or a "computer".

The medium can be an electronic, magnetic, optical, electromagnetic, infrared or semiconductor system (or device) or a propagation medium. Examples of computer-readable media include semiconductor or solid-state memory, magnetic tape, removable computer diskettes, random access memory (RAM), read-only memory (ROM), rigid magnetic disks, and optical disks. At present, optical disks include compact disk read-only (CD-ROM) disks, compact disk read/write (CD-R/W) disks, and DVDs.

Data processing systems for storage and/or execution of programming code include at least one processor connected directly or indirectly to a memory element via a system bus. Memory elements include local memory used during the actual execution of programming code, bulk storage devices, and cache memory provided to temporarily store at least some programming code to decrease the number of times programming code has to be read from a bulk storage device during execution.

The invention claimed is:

1. A method for processing a first message group and a second message group submitted by a user on the basis of the date and time submitted with each message, the method comprising:

executing, with a computer, a learning operation and an estimating operation;

the learning operation comprising:

extracting a first location message from the first message group, the first location message being a message having a specifiable location;

extracting a first expression message from the first message group, the first expression message being a message including a specific expression; and associating the location and the expression on the basis of the date and time submitted with each message, and for generating learning data, wherein generating learning data makes associations taking into account a periodicity of the date and time submitted with each message and wherein the periodicity is at least either a daily period, weekly period or monthly period, and the estimating operation comprising:

extracting a second expression message from the second message group, the second expression message including a predetermined expression but no location;

accepting input of a specified date and time, the specified date and time being the date and time at which the user submitted the second expression message;

associating the expressions with each other on the basis of the specified date and time and the date and time submitted with each second expression message, and for generating input data, wherein an association between the expressions has a value that is inversely related to a duration of time between the specified date and time and the date and time submitted with each second expression message such that as the duration is longer the value of the association decreases; and estimating a location of the user at the specified date and time using coordination filtering on the basis of the learning data and the input data.

2. The method of claim 1, wherein the extracting the first location message extracts the first message as a first location message on condition that the first location message includes a place name found in a pre-installed place name dictionary.

3. The method of claim 1, wherein the generating learning data makes associations taking into account the periodicity of the date and time submitted with each message on condition that the user profile is a predetermined profile.

4. The method of claim 1, wherein the learning operation further comprises associating the location and the expression to generate learning date on condition that the user profile has place of work and the first expression message indicates "at work".

5. The method of claim 1, wherein the learning operation further comprises associating the location and the expression to generate leaning data on condition that the user profile has place of residence and the first expression message indicates "at home".

6. The method of claim 1, wherein the accepting input of a specified date and time accepts the date and time submitted with a specific second expression method by accepting selection of the specific second expression message, and further comprises an output operation, and wherein the output operation comprises displaying a location at the specified date and time in association with the specific second expression message.

7. The method of claim 6, wherein the second message group is displayed on a time line, the second expression messages are displayed in a mode allowing for selection, and wherein a location at a specified date and time associated with the specific second expression message is displayed in response to selection of the specific second expression message.

8. A system, comprising:

a computer configured to process a first message group and a second message group submitted by a user on the basis of the date and time submitted with each message, the computer comprising a learning module and an estimating module, each module implemented by a processor of the computer;

the learning module configured to:

extract a first location message from the first message group, the first location message being a message having a specifiable location;

extract a first expression message from the first message group, the first expression message being a message including a specific expression; and associate the location and the expression on the basis of the date and time submitted with each message, and for generating learning data, wherein generating learning data makes associations taking into account a periodicity of the date and time submitted with each message and wherein the periodicity is at least either a daily period, weekly period or monthly period; and the estimating module configured to:
- extract a second expression message from the second message group, the second expression message including a predetermined expression but no location;
- accept input of a specified date and time, the specified date and time being the date and time at which the user submitted the second expression message;
- associate the expressions with each other on the basis of the specified date and time and the date and time submitted with each second expression message, and for generating input data, wherein an association between the expressions has a value that is inversely related to a duration of time between the specified date and time and the date and time submitted with each second expression message such that as the duration is longer the value of the association decreases; and
- estimate a location of the user at the specified date and time using coordination filtering on the basis of the learning data and the input data.

9. The system of claim 8, wherein extracting the first location message extracts the first message as a first location message on condition that the first location message includes a place name found in a pre-installed place name dictionary.

10. The system of claim 8, wherein generating learning data makes associations taking into account the periodicity of the date and time submitted with each message on condition that the user profile is a predetermined profile.

11. The system of claim 8, wherein the learning module is further configured to associate the location and the expression to generate learning date on condition that the user profile has place of work and the first expression message indicates "at work".

12. The system of claim 8, wherein the learning module is further configured to associate the location and the expression to generate leaning data on condition that the user profile has place of residence and the first expression message indicates "at home".

13. The system of claim 8, wherein accepting input of a specified date and time accepts the date and time submitted with a specific second expression method by accepting selection of the specific second expression message, and further comprises an output operation, and wherein the output operation comprises displaying a location at the specified date and time in association with the specific second expression message.

14. The system of claim 13, wherein the second message group is displayed on a time line, the second expression messages are displayed in a mode allowing for selection, and wherein a location at a specified date and time associated with the specific second expression message is displayed in response to selection of the specific second expression message.

15. A non-transitory computer readable storage medium having computer readable instructions stored thereon that, when executed by a computer, implement a method for processing a first message group and a second message group submitted by a user on the basis of the date and time submitted with each message, the method comprising:
- executing, with the computer, a learning operation and an estimating operation;
- the learning operation comprising:
- extracting a first location message from the first message group, the first location message being a message having a specifiable location;
- extracting a first expression message from the first message group, the first expression message being a message including a specific expression; and
- associating the location and the expression on the basis of the date and time submitted with each message, and for generating learning data, wherein generating learning data makes associations taking into account a periodicity of the date and time submitted with each message and wherein the periodicity is at least either a daily period, weekly period or monthly period; and
- the estimating operation comprising:
- extracting a second expression message from the second message group, the second expression message including a predetermined expression but no location;
- accepting input of a specified date and time, the specified date and time being the date and time at which the user submitted the second expression message;
- associating the expressions with each other on the basis of the specified date and time and the date and time submitted with each second expression message, and for generating input data, wherein an association between the expressions has a value that is inversely related to a duration of time between the specified date and time and the date and time submitted with each second expression message such that as the duration is longer the value of the association decreases; and
- estimating a location of the user at the specified date and time using coordination filtering on the basis of the learning data and the input data.

16. The computer readable storage medium of claim 15, wherein the extracting the first location message extracts the first message as a first location message on condition that the first location message includes a place name found in a pre-installed place name dictionary.

17. The computer readable storage medium of claim 15, wherein the generating learning data makes associations taking into account the periodicity of the date and time submitted with each message on condition that the user profile is a predetermined profile.

* * * * *